(12) United States Patent
Watanabe et al.

(10) Patent No.: US 8,228,424 B2
(45) Date of Patent: Jul. 24, 2012

(54) ELECTRONIC DEVICE

(75) Inventors: Toshiyuki Watanabe, Gifu (JP); Yusuke Tani, Sakai (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 810 days.

(21) Appl. No.: 12/399,605

(22) Filed: Mar. 6, 2009

(65) Prior Publication Data

US 2009/0225503 A1 Sep. 10, 2009

(30) Foreign Application Priority Data

Mar. 6, 2008 (JP) .................................. 2008-055721

(51) Int. Cl.
*H04N 5/225* (2006.01)

(52) U.S. Cl. ........................................................ 348/373

(58) Field of Classification Search .................. 348/373, 348/374, 375, 376; 396/535, 536, 540; 455/575.1, 455/575.3, 575.4, 575.8; 439/135, 136, 137, 439/138, 139, 140, 141, 142, 149
See application file for complete search history.

(56) References Cited

U.S. PATENT DOCUMENTS

2006/0154520 A1* 7/2006 Gennai et al. .................. 439/578
2007/0165365 A1* 7/2007 Kamiya ........................ 361/679

FOREIGN PATENT DOCUMENTS

| CN | 1930742 A | | 3/2007 |
|---|---|---|---|
| CN | 101528015 B | | 9/2011 |
| JP | 9-8472 A | | 1/1997 |
| JP | 9-249243 A | | 9/1997 |
| JP | 10255900 A | * | 9/1998 |
| JP | 11273780 A | * | 10/1999 |
| JP | 2004-214969 A | | 7/2004 |
| JP | 2006-114300 A | | 4/2006 |
| JP | 2007-200604 A | | 8/2007 |

* cited by examiner

*Primary Examiner* — Nicholas Giles
(74) *Attorney, Agent, or Firm* — Westerman, Hattori, Daniels & Adrian, LLP (57) ABSTRACT

An electronic device of the present invention includes a casing with an opening, and a cover member for covering the opening. The cover member includes: a cover part for covering the opening; a shank projecting from a rear surface of the cover part; and a protrusion sticking out of the shank. The shank passes through a hole defined in the casing. The protrusion extends in a direction crossing an axis of the shank, at a position opposite to the cover part with respect to the hole. The cover member is capable of moving back and forth along the axis of the shank, between a depressed position where the cover part covers the opening and a pulled-out position where the cover part is apart from the opening. The casing has a first receiving part for receiving the protrusion to prevent the pivotal movement of the cover member about the shank when the cover member moves back and forth between the depressed position and the pulled-out position, and receiving the protrusion to prevent the pressing-in of the cover member after having moved pivotally about the shank while enabling the pivotal movement of the cover member about the shank when the cover member is in the pulled-out position.

8 Claims, 14 Drawing Sheets

ELECTRONIC DEVICE

The Japanese application Number 2008-055721, upon which this patent application is based, is hereby incorporated by reference.

BACKGROUND OF THE INVENTION

1. Field of the Invention

The present invention relates to an electronic device, and more specifically, to an electronic device with a damage-resistant casing.

2. Description of Related Art

An electronic device such as a mobile phone or a video camcorder is provided with a memory card socket or a battery socket. A cover member is conventionally fitted onto a socket to avoid the entry of a foreign substance into the socket.

When a cover member is removable from a casing of an electronic device, the cover member may be lost after being removed from the casing, or may fall off a socket. In response, there has been suggested a technique of connecting the cover member and the casing while prohibiting the separation between the cover member and the casing.

In more detail, a cover member has a cover part for covering a socket, a shank, and a protrusion. The shank projects from the rear surface of the cover part, and passes through a hole defined in a casing. The protrusion is greater in dimension than the hole, and is fixed to the tip of the shank. Thus, if the cover member is pulled out of the casing, the protrusion cannot pass through the hole. Accordingly, the cover member remains connected to the casing after being pulled out of the casing. This avoids the loss or falling-off of the cover member.

In the technique discussed above, when a cover member is pulled out of a casing, the cover member pivotally moves about a shank irrespective of where the cover member after being pulled out is located. This causes the pulled-out cover member to contact the casing, so the casing may be damaged by the cover member.

SUMMARY OF THE INVENTION

The present invention is intended to provide an electronic device in which a casing is hardly damaged by a cover member even when the cover member is pulled out of the casing.

The electronic device of the present invention includes a casing with an opening, and a cover member for covering the opening. The cover member includes: a cover part for covering the opening; a shank projecting from a rear surface of the cover part; and a protrusion sticking out of the shank. The shank passes through a hole defined in the casing. The protrusion extends in a direction crossing an axis of the shank, at a position opposite to the cover part with respect to the hole. The cover member is capable of moving back and forth along the axis of the shank, between a depressed position where the cover part covers the opening and a pulled-out position where the cover part is apart from the opening.

The casing has a first receiving part for receiving the protrusion to prevent the pivotal movement of the cover member about the shank when the cover member moves back and forth between the depressed position and the pulled-out position, and receiving the protrusion to prevent the pressing-in of the cover member after having moved pivotally about the shank while enabling the pivotal movement of the cover member about the shank when the cover member is in the pulled-out position.

This electronic device enables the pulling-out and pressing-in of the cover member. Further, the first receiving part prevents the pivotal movement of the cover member about the shank to thereby avoid the contact between the cover part and the casing when the cover member moves back and forth between the depressed position and the pulled-out position. When the cover member is in the pulled-out position, the cover member for which the pivotal movement has been enabled moves pivotally about the shank to prevent the pressing-in of the cover member. Thus, the cover part stays away from the casing to thereby avoid the contact between the cover part and the casing.

In a more specific structure, the casing further has a second receiving part for receiving the protrusion to prevent the cover member from being disconnected from the casing, irrespective of an angle of pivotal movement of the cover member in the pulled-out position. In more detail, the protrusion overlaps the second receiving part when viewed in a direction opposite to a pulling-out direction of the cover member, irrespective of an angle of pivotal movement of the cover member.

In another specific structure, space for allowing the pivotal movement of the protrusion about the shank is defined in the casing between the first and second receiving parts, and the protrusion is located in the space when the cover member is in the pulled-out position. The pivotal movement of the cover member in the pulled-out position about the shank causes the protrusion to overlap the first receiving part when viewed in a direction opposite to a pulling-out direction of the cover member.

In still another specific structure, the protrusion has a side surface extending along the axis of the shank, the first receiving part has a side surface extending in a pulling-out direction of the cover member, and when the cover member moves back and forth between the depressed position and the pulled-out position, the side surface of the protrusion faces the side surface of the first receiving part with a short distance from the side surface of the first receiving part, or has face-to-face contact with the side surface of the first receiving part.

In more detail, two sets each of which being constituted by the side surface of the protrusion and the side surface of the first receiving part facing each other with a short distance therebetween, or in face-to-face contact with each other, are provided, and respective side surfaces of the protrusion belonging to the two sets face each other, with distances from a center of the shank to the side surfaces of the protrusion being different from each other.

In yet another specific structure, the first receiving part defines space for storing therein the protrusion when the cover member moves back and forth between the depressed position and the pulled-out position, and a maximum width of an outer edge of the protrusion when viewed in a direction opposite to a pulling-out direction of the cover member is greater than a minimum width of the space when viewed in a direction opposite to the pulling-out direction.

According to the electronic device of the present invention, the cover member hardly damages the casing even when the cover member is pulled out of the casing.

DETAILED DESCRIPTION OF THE EMBODIMENTS

A preferred embodiment of the present invention is discussed in detail below with reference to drawings.

Figure 1:
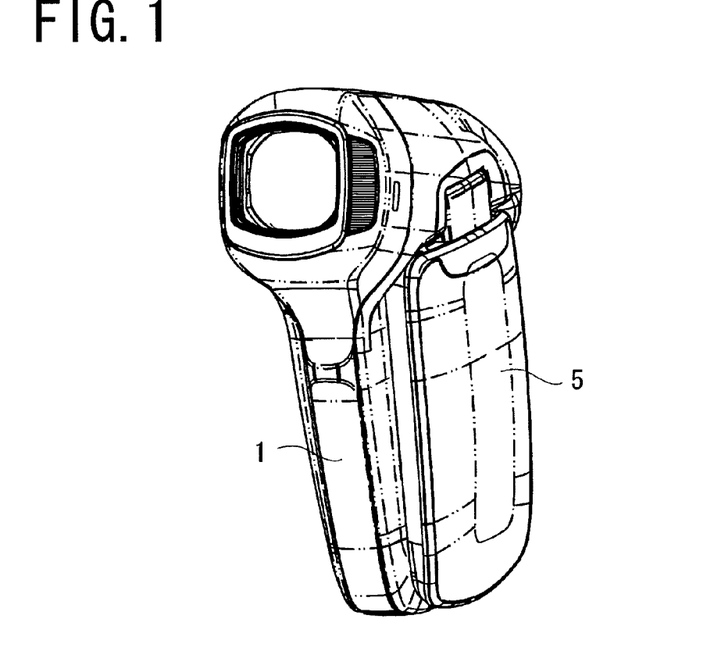
FIG. 1 is a perspective view of a video camcorder from the front side that is an electronic device according to a preferred embodiment of the present invention.
Figure 2:
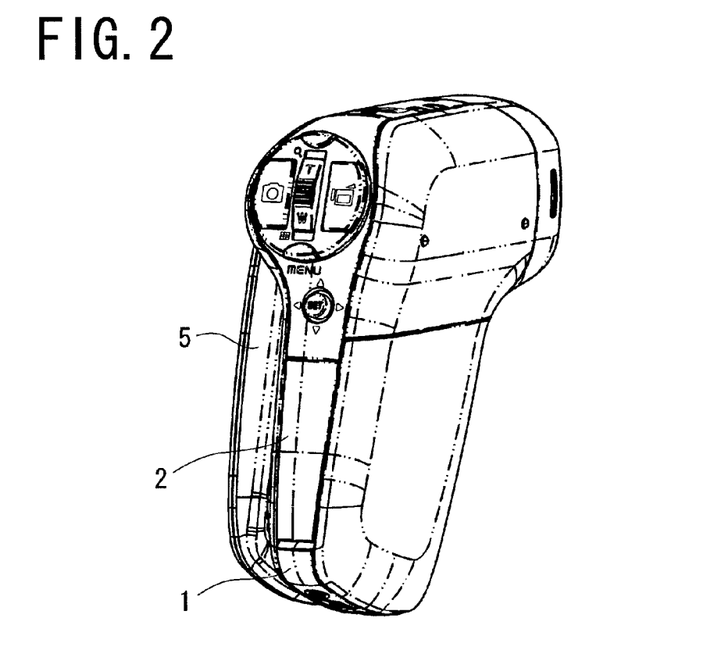
FIG. 2 is a perspective view of the video camcorder shown in FIG. 1 from the rear side.
Figure 3:
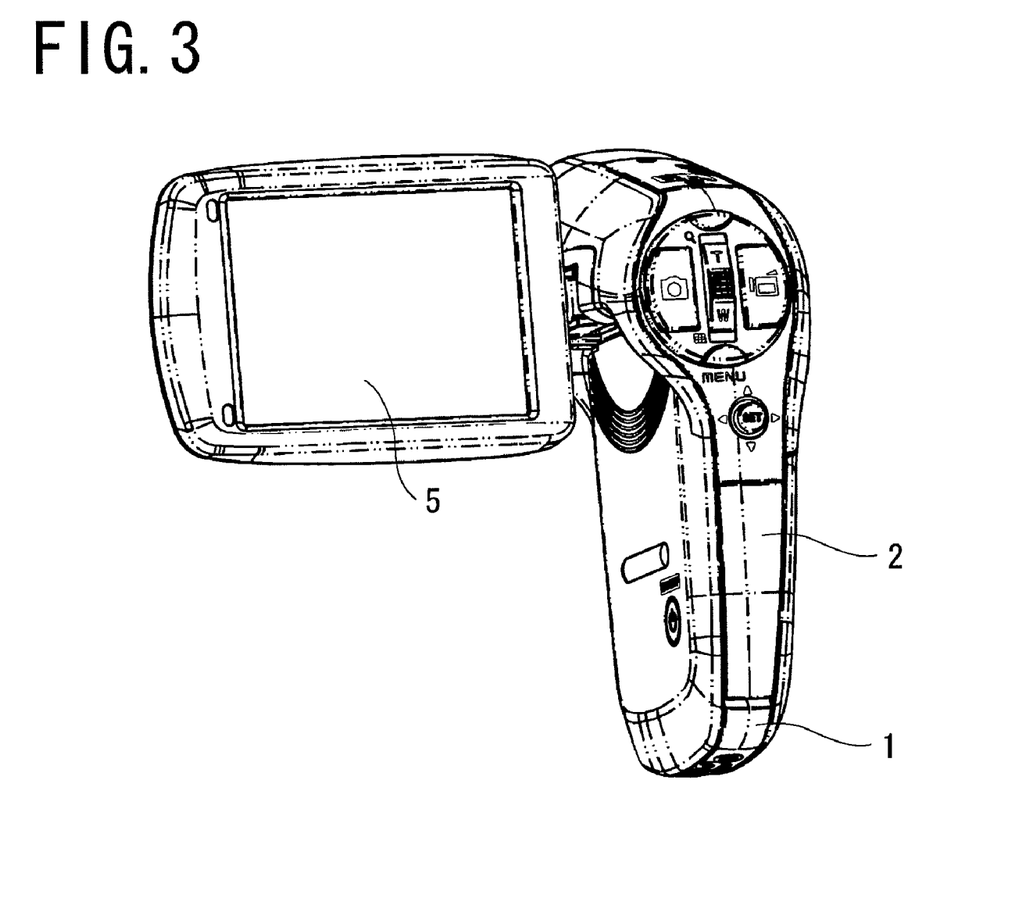
FIG. 3 is a perspective view of the video camcorder from the rear side when an image display panel is opened.

As shown in FIGS. 1 and 2, a video camcorder has a casing 1, a cover member 2 and an image display panel 5. The image display panel 5 is capable of opening as shown in FIG. 3 so that images can be viewed during image capturing.

Figure 4:
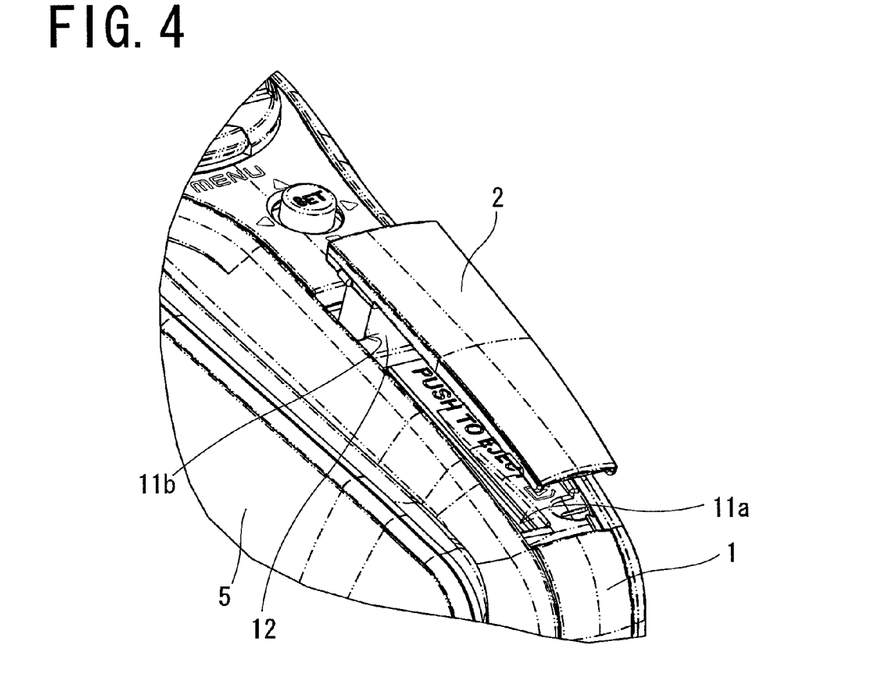
FIGS. 4 and 5 each show part of the video camcorder in enlarged manner.
Figure 5:
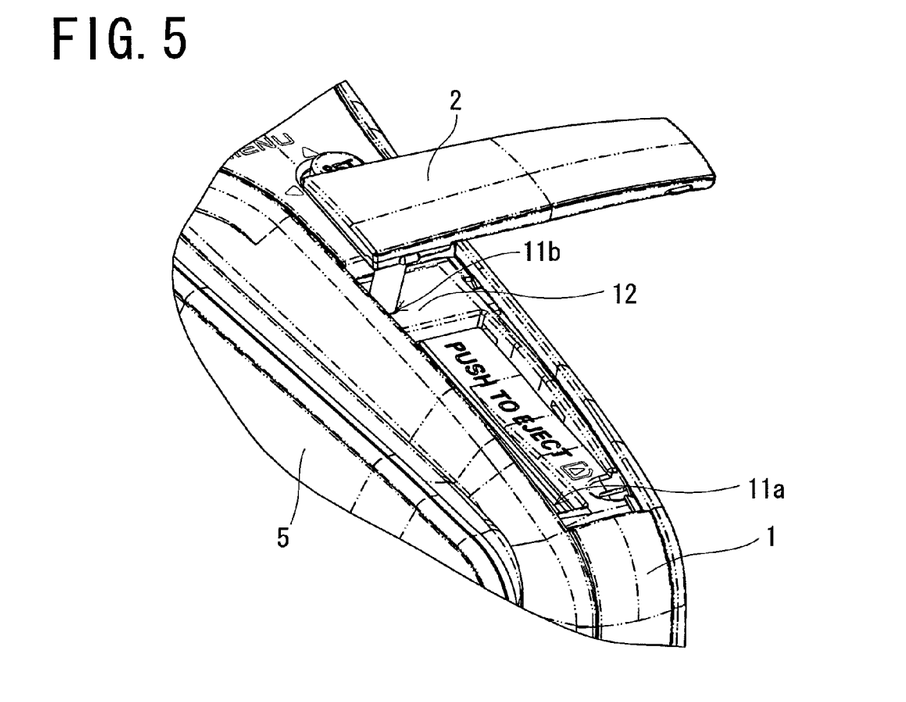

With reference to FIGS. 4 and 5, the casing 1 is provided with a memory card socket 11a. The cover member 2 is attached to the casing 1 in such a manner that the socket 11a can be covered or exposed by the cover member 2. The socket 11a is regarded as an opening defined in the casing 1.

Figure 6A:
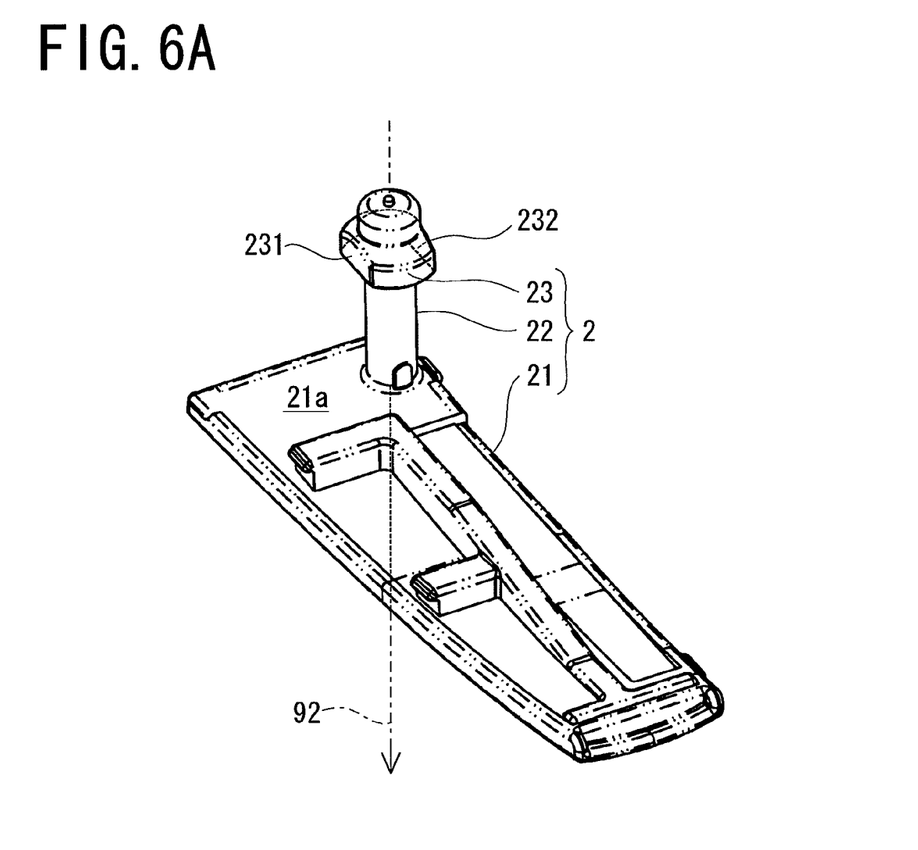
FIG. 6A is an enlarged perspective view of a cover member.
Figure 7:
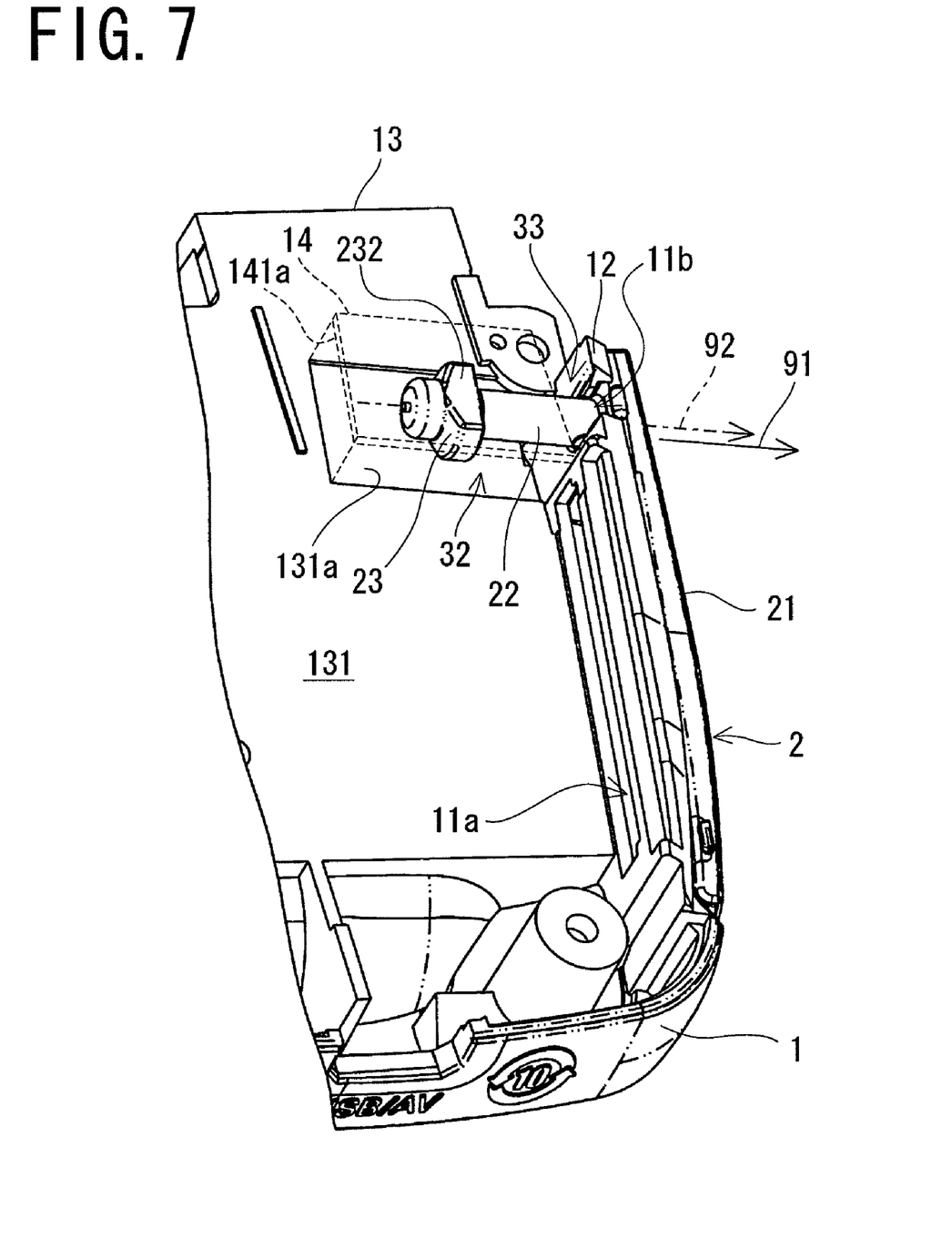
FIG. 7 is a perspective view of the cover member in a depressed position.

With reference to FIG. 6A, the cover member 2 has a cover part 21 for covering the socket 11a, a shank 22 projecting from a rear surface 21a of the cover part 21, and a protrusion 23. As shown in FIG. 7, the shank 22 passes through a hole 11b defined in the casing 1, at a position close to the socket 11a.

Figure 6B:
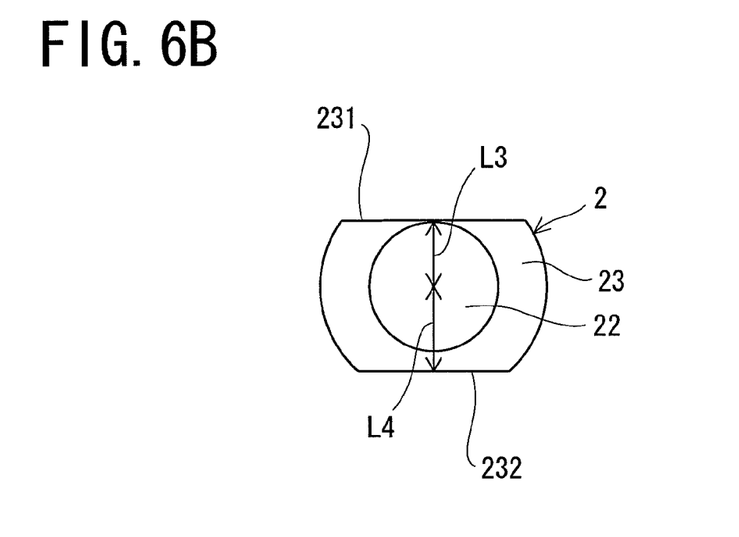
FIG. 6B shows a protrusion when viewed in an axial direction.

As seen from FIG. 7, the protrusion 23 sticks out of the shank 22 passing through the hole 11b, at a position opposite to the cover part 21 with respect to the hole 11b, and in a direction crossing an axis 92. The protrusion 23 has two side surfaces 231 and 232 extending along the axis 92 of the shank 22 as shown in FIGS. 6A and 6B. As seen from FIG. 6B, a distance L3 from the center of the shank 22 to the side surface 231 differs from a distance L4 from the center of the shank 22 to the side surface 232.

Figure 8:
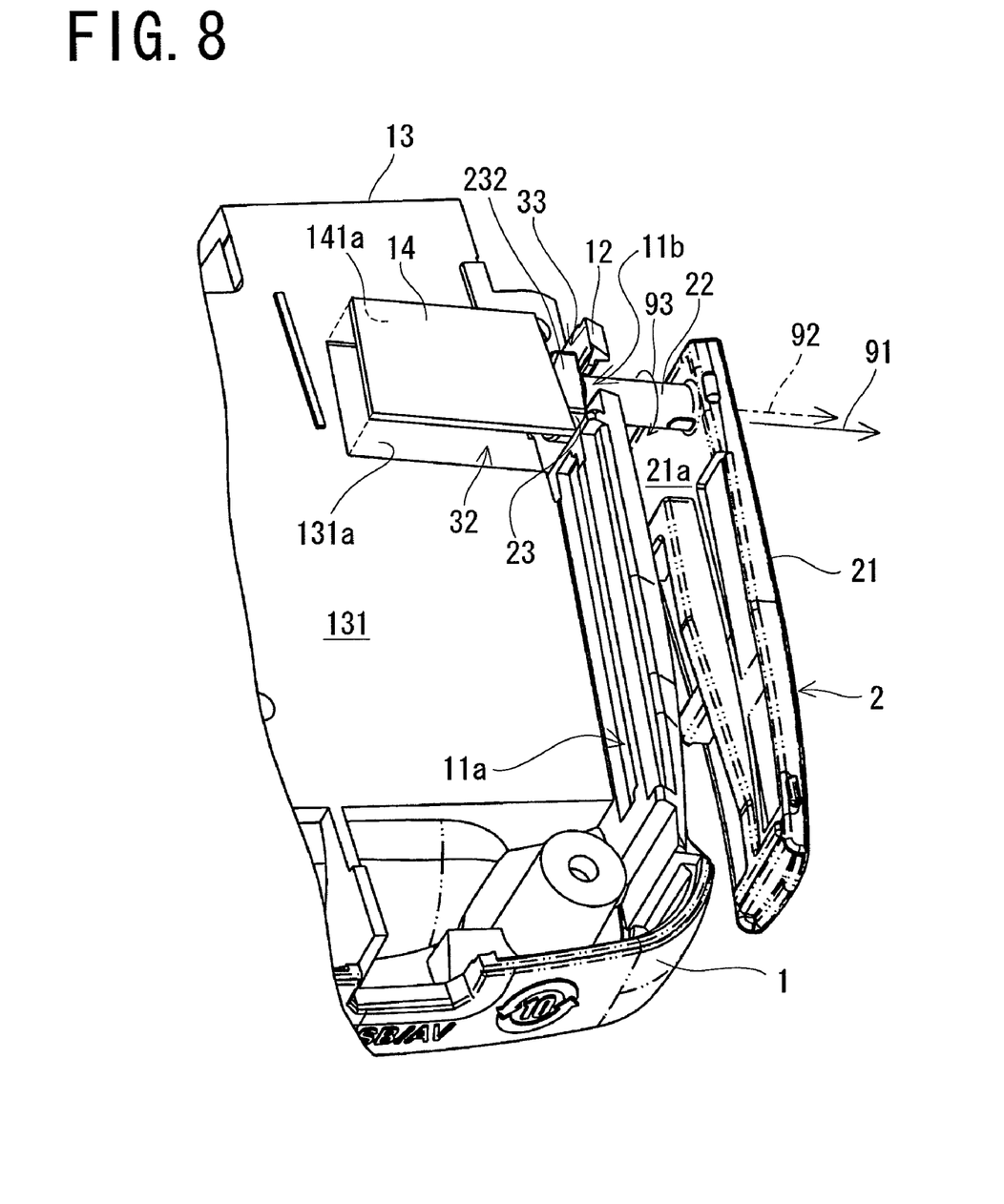
FIG. 8 is a perspective view of the cover member after having moved from the depressed position to a pulled-out position.
Figure 9:
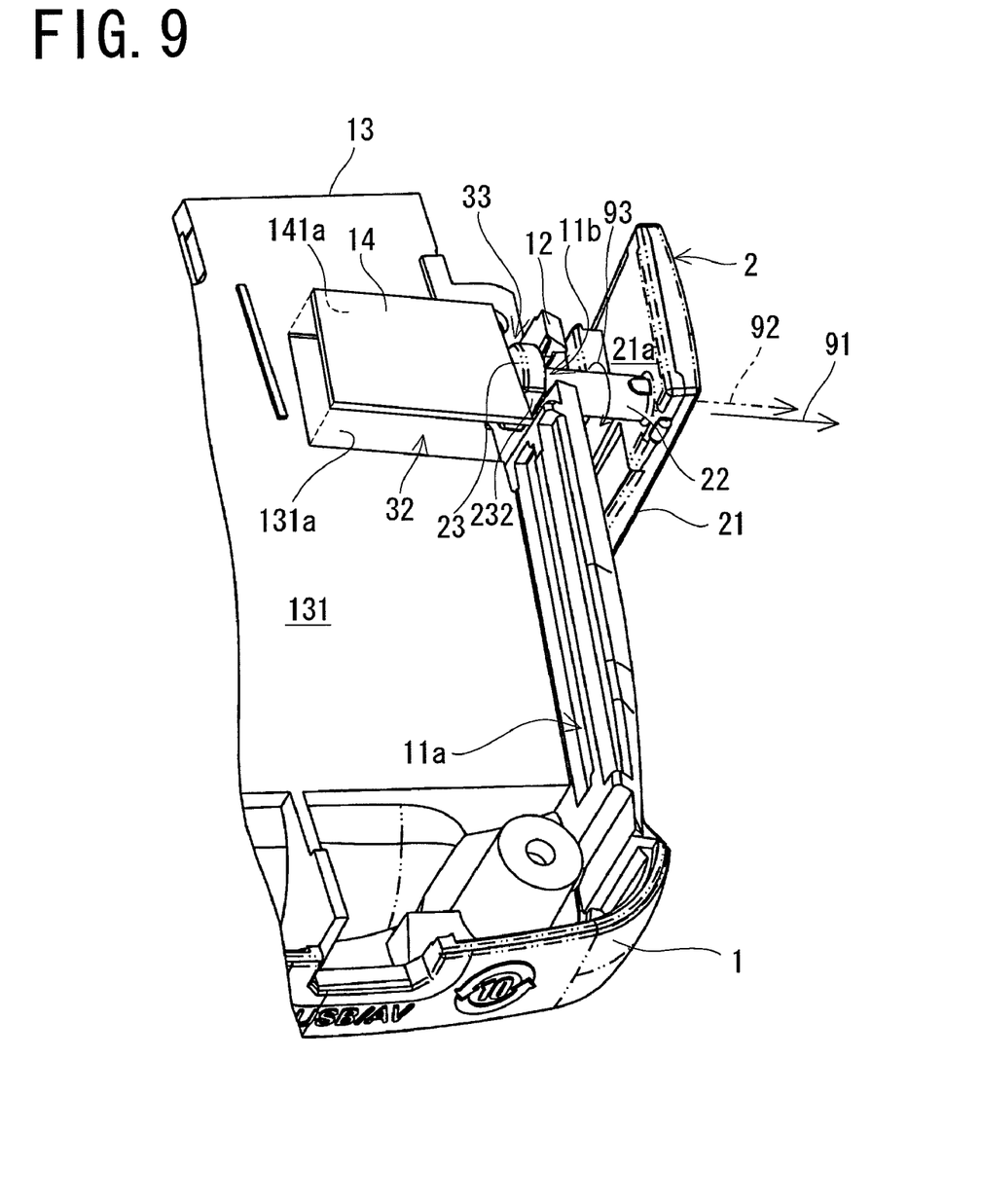
FIG. 9 is a perspective view of the cover member after having moved pivotally about a shank when the cover member is in the pulled-out position.

The cover member 2 is capable of moving back and forth along the axis 92 of the shank 22, between a depressed position where the cover part 21 covers the socket 11a (hereinafter simply called as a "depressed position") as shown in FIG. 7, and a pulled-out position where the cover part 21 is apart from the socket 11a (hereinafter simply called as a "pulled-out position") as shown in FIGS. 8 and 9.

Figure 10:
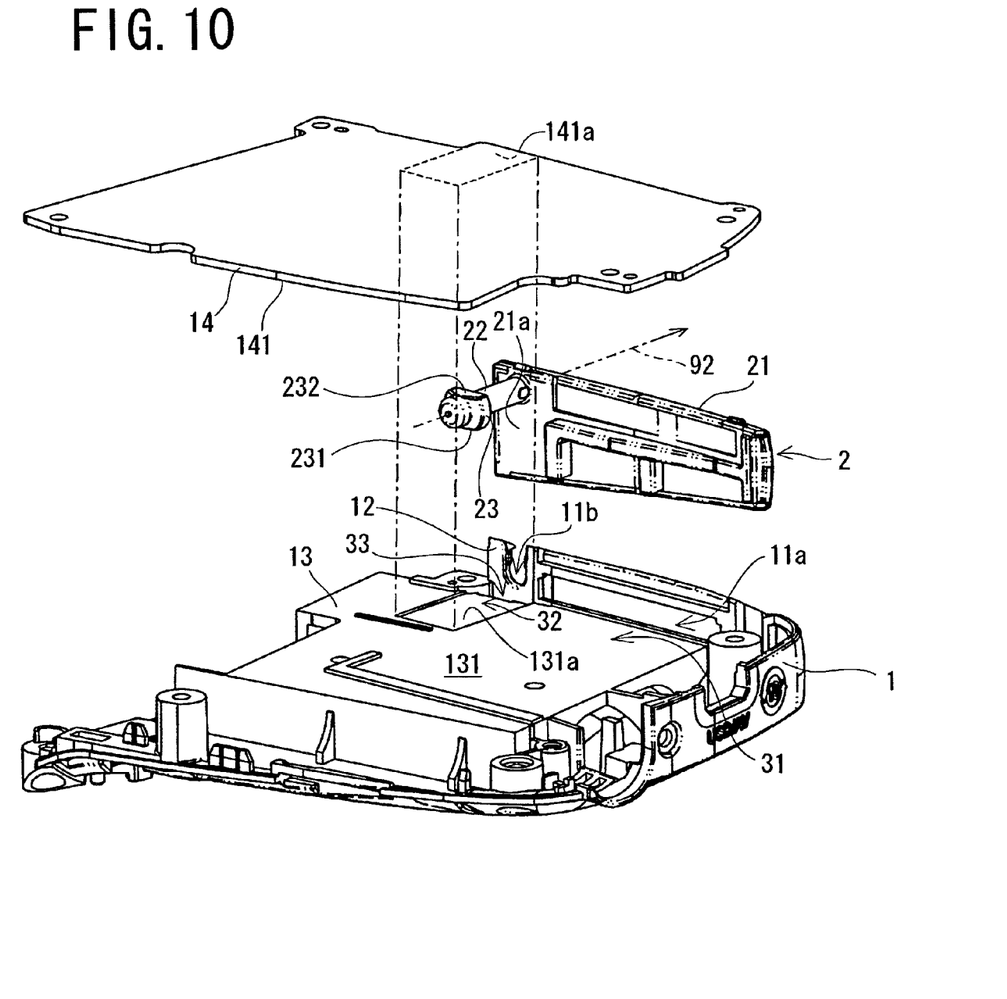
FIG. 10 is an exploded perspective view showing part of the video camcorder.

With reference to FIG. 10, the casing 1 has a side wall section 13, and a circuit board 14 is arranged inside the casing 1. The circuit board 14 may alternatively be provided to the casing 1. A side surface 141 of the circuit board 14 facing the side wall section 13, and a side surface 131 of the side wall section 13 facing the circuit board 14 define spaces 31 and 32 between the circuit board 14 and the side wall section 13. Space forming surfaces 131a and 141a of the side surfaces 131 and 141 respectively that define the space 32 extend in a direction 91 in which the cover member 2 is pulled out and which is along the axis 92.

A hole forming section 12 of the casing 1 for defining the hole 11b, the circuit board 14 and the side wall section 13 define space 33 between the circuit board 14 and the side wall section 13, and the hole forming section 12.

The space 31 stores therein a memory card inserted into the socket 11a. The space 32 stores therein the protrusion 23 in such a manner that the protrusion 23 is allowed to move inside the space 32. The space 33 allows the pivotal movement of the protrusion 23 about the shank 22. Here, the "pivotal movement" includes "rotation", which is also applied to the description below.

Next, the condition of the cover member 2 is discussed in detail when the cover member 2 opens or closes. When the cover member 2 is in the depressed position, the cover part 21 covers the socket 11a and the protrusion 23 is stored in the space 32 as shown in FIG. 7.

Figure 11:
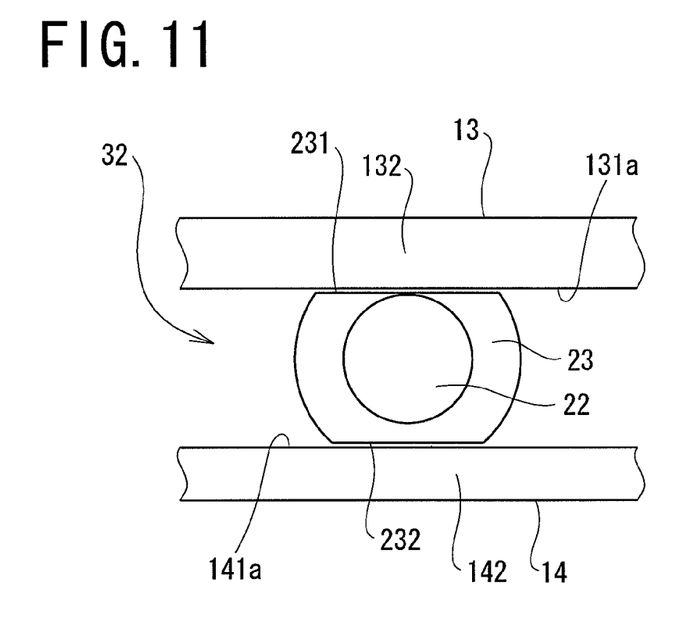
FIG. 11 shows the protrusion of the cover member in the state shown in FIG. 7 when viewed in a direction opposite to pulling-out direction.

FIG. 11 depicts the protrusion 23 of the cover member 2 in the depressed position when viewed in a direction opposite to the pulling-out direction 91, showing the relation between the protrusion 23 and the space forming surfaces 131a, 141a. The side surface 231 of the protrusion 23 faces the space forming surface 131a of the side wall section 13, with a short distance from the space forming surface 131a. The side surface 232 of the protrusion 23 faces the space forming surface 141a of the circuit board 14, with a short distance from the space forming surface 141a. The side surfaces 231 and 232 may contact the space forming surfaces 131a and 141a respectively.

When the cover member 2 moves from the depressed position to the pulled-out position, the cover part 21 goes away from the casing 1 to expose the covered socket 11a as shown in FIG. 8. At this time, the shank 22 is pulled out to the outside of the casing 1 through the hole 11b, by which the protrusion 23 fixed to the shank 22 moves in the space 32 toward the hole 11b to reach the space 33.

When the protrusion 23 moves in the space 32, the side surfaces 231 and 232 of the protrusion 23 keep facing relations with the space forming surfaces 131a and 141a with short distances from the space forming surfaces 131a and 141a respectively as shown in FIG. 11, or keep contacts with the space forming surfaces 131a and 141a respectively. Thus, in the process of pulling the cover member 2 out, the side wall section 13 and the circuit board 14 prevent the pivotal movement of the protrusion 23 about the shank 22. This is also applied to the process of pressing the cover member 2. Namely, when the cover member 2 moves back and forth between the depressed position and the pulled-out position, the side wall section 13 and the circuit board 14 receive the protrusion 23 to thereby prevent the pivotal movement of the cover member 2 about the shank 22.

Accordingly, when the cover member 2 is pulled out of the casing 1 and pressed into the casing 1, the cover part 21 is in the same posture about the shank 22 as that of covering the socket 11a. Thus, the casing 1 is hardly damaged by the cover part 21.

The pivotal movement of the protrusion 23 that has been prevented by the side wall section 13 and the circuit board 14 becomes possible when the protrusion 23 moves in the space 32 to reach the space 33. This allows the pivotal movement of the cover member 2 about the shank 22 (in a direction 93).

Figure 12:
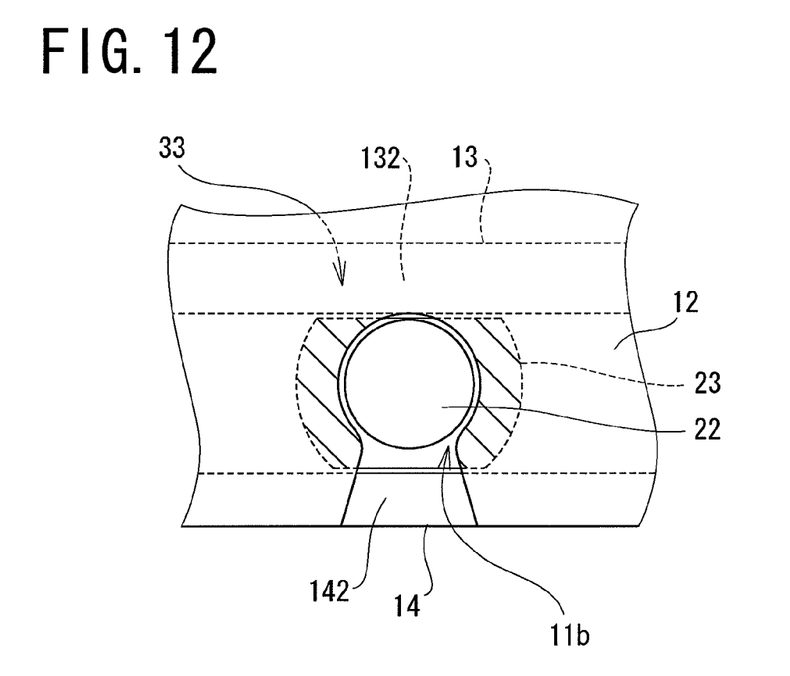
FIG. 12 shows the protrusion of the cover member in the state shown in FIG. 8 when viewed in a direction opposite to the pulling-out direction.

The protrusion 23 after having reached the space 33 overlaps the hole forming section 12 when viewed in a direction opposite to the pulling-out direction 91, as shown in FIG. 12. So, when the cover member 2 in the pulled-out position is intended to be pulled out further from the casing 1, the protrusion 23 gets struck with the hole forming section 12. The hole forming section 12 thereby prevents the cover member 2 in the pulled-out position from being disconnected to fall off the casing 1. In FIG. 12, a diagonally shaded area shows an overlap between the protrusion 23 and the hole forming section 12, which is also applied to FIGS. 14 and 16 discussed later.

When the cover member 2 in the pulled-out position as shown in FIG. 8 pivotally moves about the shank 22 (in the direction 93), the cover part 21 pivotally moves about the shank 22 (in the direction 93) while being kept away from the casing 1.

Figure 13:
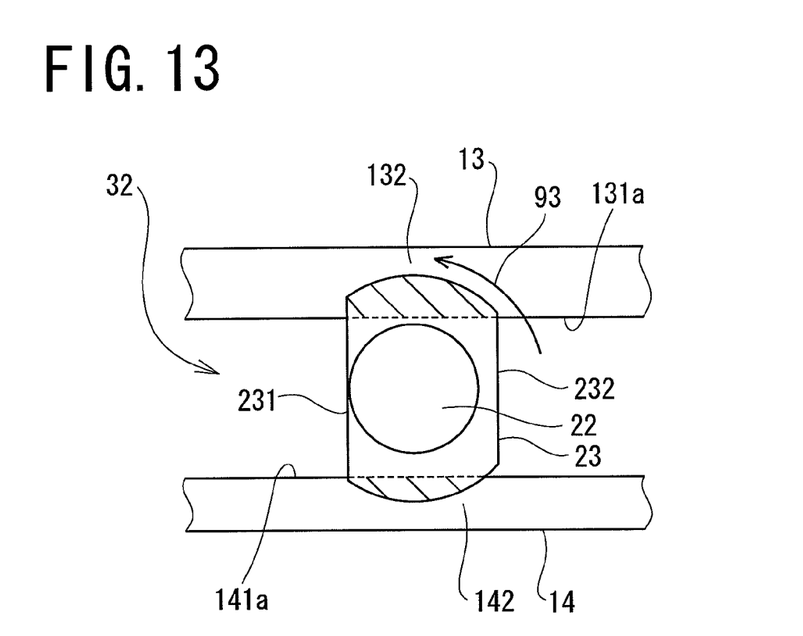
FIGS. 13 and 14 each show the protrusion of the cover member in the state shown in FIG. 9 when viewed in a direction opposite to the pulling-out direction.
Figure 15:
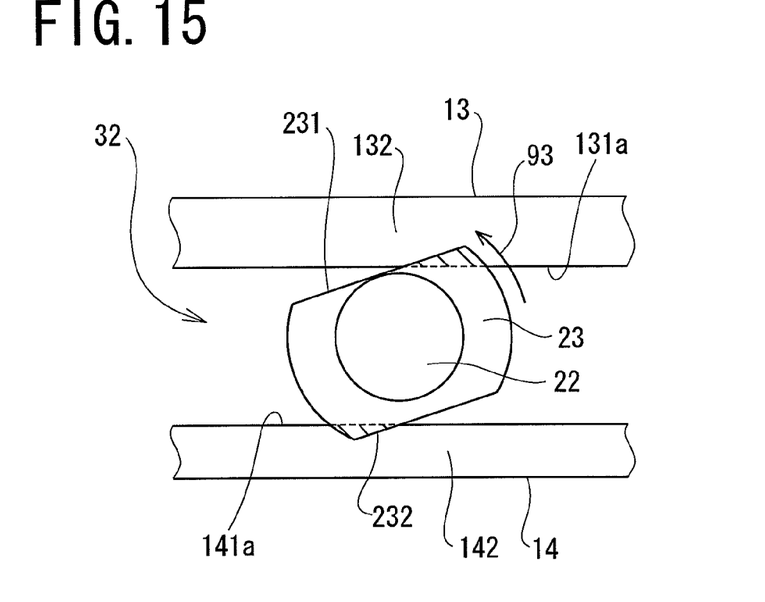
FIGS. 15 and 16 each show the protrusion after having moved pivotally to an angle smaller than 90 degrees when viewed in a direction opposite to the pulling-out direction.

FIG. 13 depicts the protrusion 23 of the cover member 2 after having moved pivotally about the shank 22 (in the direction 93) when viewed in a direction opposite to the pulling-out direction 91, showing the relation between the protrusion 23 and the space forming surfaces 131a, 141a. FIG. 15 discussed later depicts the protrusion 23 in the same way, and shows the same relation. FIG. 13 depicts the protrusion 23 after having moved pivotally about the shank 22 (in the direction 93) about 90 degrees from the state shown in FIG. 8.

When the cover member 2 in the pulled-out position pivotally moves about the shank 22 (in the direction 93), the protrusion 23 overlaps the side wall section 13 and the circuit board 14. In FIG. 13, a diagonally shaded area shows an overlap between the side wall section 13 and the circuit board 14, and the protrusion 23, which is also applied to FIG. 15 discussed later.

Thus, when the cover member 2 in the pulled-out position after having moved pivotally about the shank 22 (in the direction 93) is intended to be pressed into the casing 1, the protrusion 23 gets stuck with an end 132 of the side wall section 13 on the side of the space 33 and an end 142 of the circuit board 14 on the side of the space 33. Namely, when the cover member 2 is in the pulled-out position, the side wall section 13 and the circuit board 14 receive the protrusion 23 to thereby prevent the pressing-in of the cover member 2 after having moved pivotally about the shank 22.

As a result, the cover part 21 is kept away from the casing 1 to thereby avoid the contact between the cover part 21 and the casing 1. Thus, the casing 1 is also hardly damaged by the cover part 21 after the cover member 2 has reached the pulled-out position. In light of the structure where the side wall section 13 and the circuit board 14 receive the protrusion 23 to prevent the pivotal movement and pressing-in of the cover member 2, the side wall section 13 and the circuit board 14 may be considered as receiving parts.

Figure 14:
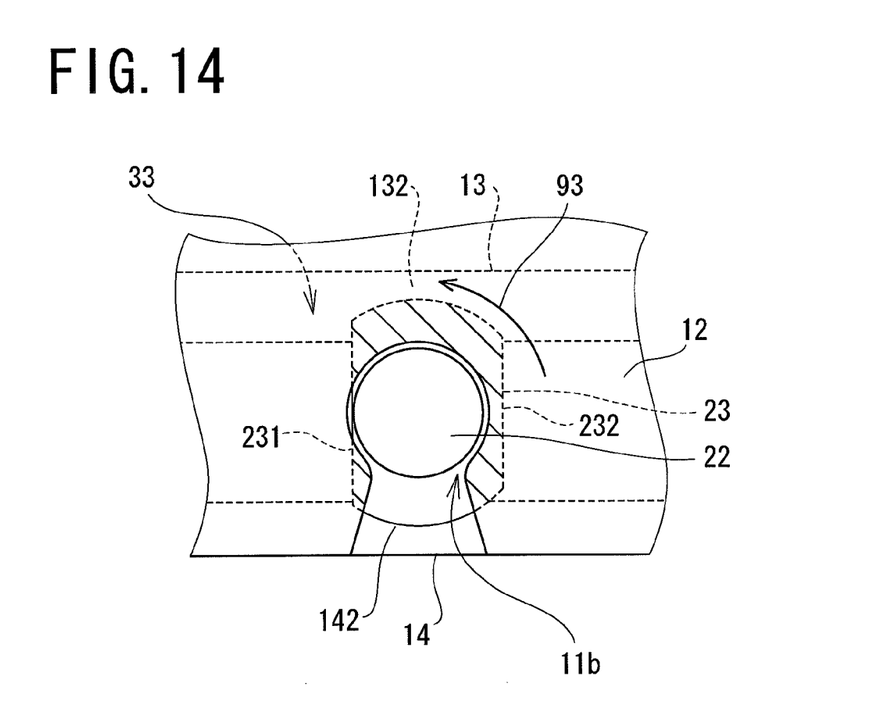

Like the case of FIG. 12, the protrusion 23 overlaps the hole forming section 12 as shown in FIG. 14 when the cover member 2 in the pulled-out position pivotally moves about the shank 22 (in the direction 93). The hole forming section 12 accordingly prevents the cover member 2 from being disconnected to fall off the casing 1. That is, irrespective of an angle of pivotal movement of the cover member 2 in the pulled-out position, the hole forming section 12 receives the protrusion 23 to prevent the cover member 2 from being disconnected from the casing 1. In light of the structure where the hole forming section 12 receives the protrusion 23 to prevent the cover member 2 from being disconnected, the hole forming section 12 may be considered as a receiving part.

As discussed above, when the protrusion 23 is in the space 32, the side surfaces 231 and 232 face the space forming surfaces 131a and 141a of the side surfaces 131 and 141 with short distances from the space forming surfaces 131a and 141a respectively as shown in FIG. 11, or have face-to-face contacts with the space forming surfaces 131a and 141a respectively. In the video camcorder with structure, the protrusion 23 may pivotally move about the shank 22 to an angle smaller than 90 degrees as shown in FIG. 15, from the state shown in FIG. 12 where the cover member 2 is in the pulled-out position.

This is because, as the side surface 231 faces the space forming surface 131a of the side surface 131 with a short distance from the space forming surface 131a, or has face-to-face contact with the space forming surface 131a, the protrusion 23 after having moved from the space 32 to the space 33 is only required to pivotally move slightly about the shank 22 (in the direction 93), so that a shade of the side surface 231 crosses the space forming surface 131a of the side surface 131 when viewed in a direction opposite to the pulling-out direction 91. Likewise, a shade of the side surface 232 crosses the space forming surface 141a of the side surface 141.

That is, the protrusion 23 after having moved from the space 32 to the space 33 is only required to pivotally move slightly about the shank 22 (in the direction 93), so that the protrusion 23 overlaps the side wall section 13 and the circuit board 14. Thus, after the cover member 2 is pulled out, pivotal and slight movement of the cover member 2 about the shank 22 (in the direction 93) makes it impossible to press the cover member 2 into the casing 1. As a result, the casing 1 is hardly damaged by the cover part 21.

Figure 16:
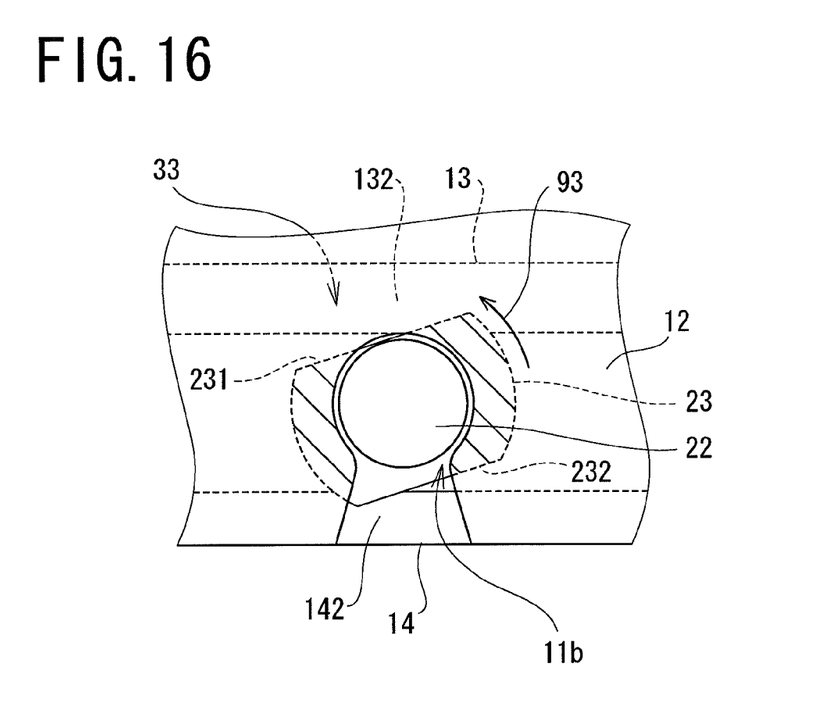

Like in the cases of FIGS. 12 and 14, the protrusion 23 overlaps the hole forming section 12 as shown in FIG. 16 when the protrusion 23 pivotally moves slightly about the shank 22 (in the direction 93), by which the hole forming section 12 prevents the cover member 2 from being disconnected.

Discussed next is the structure of the video camcorder where the distances L3 and L4 from the center of the shank 22 to the respective side surfaces 231 and 232 of the protrusion 23 differ as shown in FIG. 6B. First, it is assumed that distances from the center of the shank 22 to the side surfaces 231 and 232 are the same.

In this case, when the protrusion 23 in the pulled-out position shown in FIG. 12 pivotally moves about 180 degrees about the shank 22, the side surface 231 moves to the position where the side surface 232 was placed, and the side surface 232 moves to the position where the side surface 231 was placed. Thus, the protrusion 23 does not overlap the side wall section 13 nor the circuit board 14 even after the pivotal movement of the protrusion 23, making it impossible to prevent the press of the cover member 2 into the casing 1.

Figure 17:
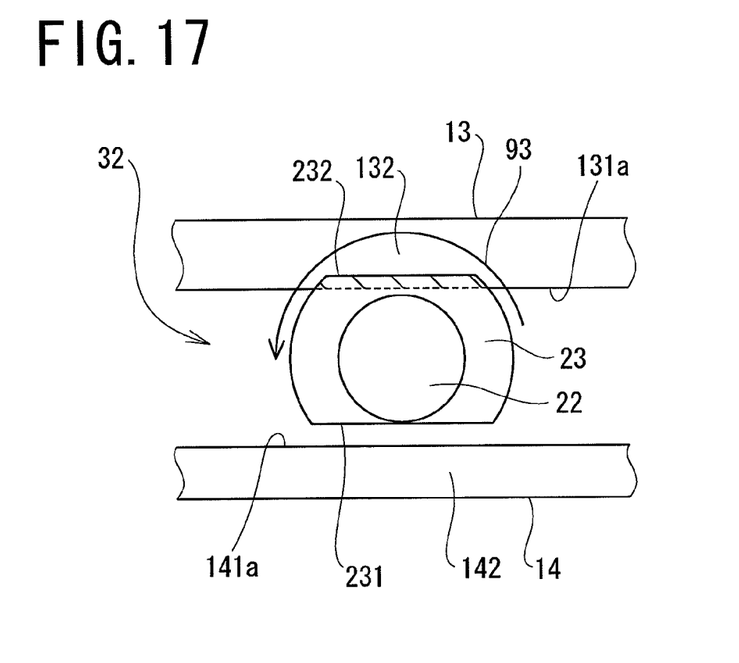
FIGS. 17 and 18 each show the protrusion after having moved pivotally 180 degrees about the shank when viewed in a direction opposite to the pulling-out direction.

In contrast, in the video camcorder discussed above shown in FIG. 6B in which the distances L3 and L4 from the center of the shank 22 to the side surfaces 231 and 232 differ, the pivotal movement of the protrusion 23 about the shank 22 about 180 degrees causes the side surface 232 to be placed over the side wall section 13 as shown in FIG. 17. Namely, the protrusion 23 is caused to overlap the side wall section 13.

Accordingly, the pivotal movement of the protrusion 23 about 180 degrees about the shank 22 also causes the protrusion 23 to get stuck with the side wall section 13, thereby preventing the press of the cover member 2 into the casing 1.

Figure 18:
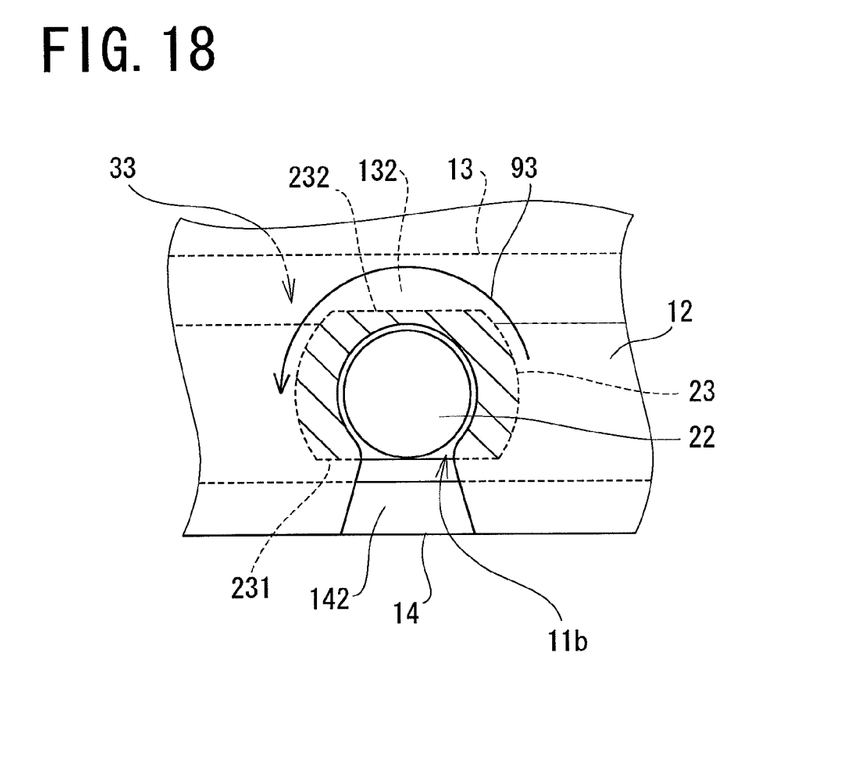

Like in the cases of FIGS. 12 and 14, the protrusion 23 overlaps the hole forming section 12 as shown in FIG. 18 when the protrusion 23 pivotally moves 180 degrees about the shank 22, by which the hole forming section 12 prevents the cover member 2 from being disconnected.

FIRST MODIFICATION

In the preferred embodiment discussed above, when the cover member 2 moves back and forth between the depressed position and the pulled-out position, the pivotal movement of the cover member 2 about the shank 22 should be prevented by receiving the protrusion 23. Further, the pressing-in of the cover member 2 after having moved pivotally about the shank 22 (in the direction 93) should be prevented by receiving the protrusion 23 when the cover member 2 is in the pulled-out position. In order to achieve these, a relation between the side wall section 13 and the circuit board 14, and the protrusion 23 shown in FIG. 19 may be established.

Figure 19:
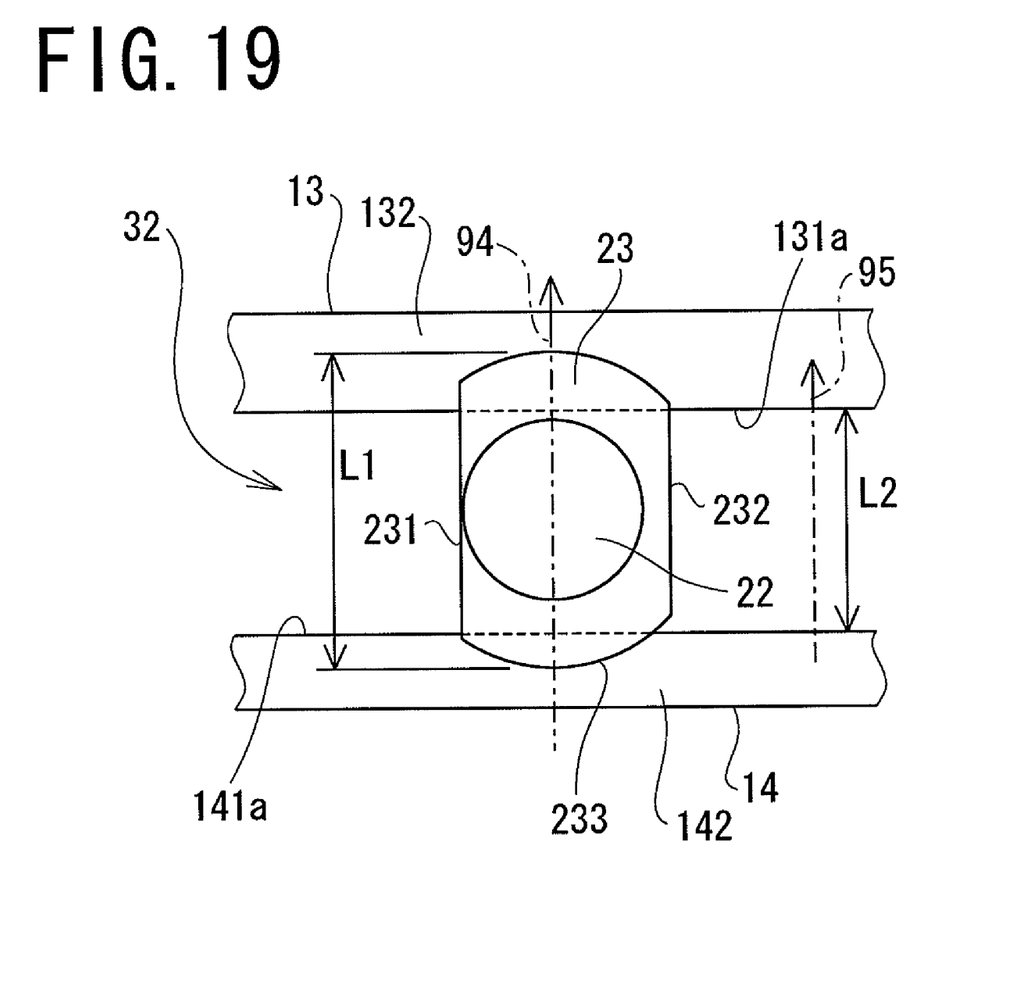
FIG. 19 shows the protrusion when viewed in a direction opposite to the pulling-out direction.

In more detail, a maximum width L1 of an outer edge 233 of the protrusion 23 when viewed in a direction opposite to the pulling-out direction 91 is greater than a minimum width L2 of the space 32 when viewed in a direction opposite to the pulling-out direction 91. Here, the minimum width L2 of the space 32 is a distance between the space forming surfaces 131a and 141a.

According to this relation of the first modification, when a direction 94 of the maximum width of the protrusion 23 coincides with a direction 95 of the minimum width of the space 32, the protrusion 23 overlaps the side wall section 13 and the circuit board 14 as shown in FIG. 19. Thus, as long as a video camcorder has the maximum width L1 of the outer edge 233 of the protrusion 23 greater than the minimum width L2 of the space 32 in which the protrusion 23 is stored, the pivotal movement of the cover member 2 in the pulled-out position about the shank 22 (in the direction 93) makes it impossible to press the cover member 2 into the casing 1. As a result, the casing 1 is hardly damaged by the cover part 21.

SECOND MODIFICATION

In the preferred embodiment discussed above, when the cover member 2 moves back and forth between the depressed position and the pulled-out position, the pivotal movement of the cover member 2 about the shank 22 should be prevented by receiving the protrusion 23. Further, the pressing-in of the cover member 2 after having moved pivotally about the shank 22 (in the direction 93) should be prevented by receiving the protrusion 23 when the cover member 2 is in the pulled-out position. In order to achieve these, a video camcorder may be the one shown in FIG. 20.

Figure 20:
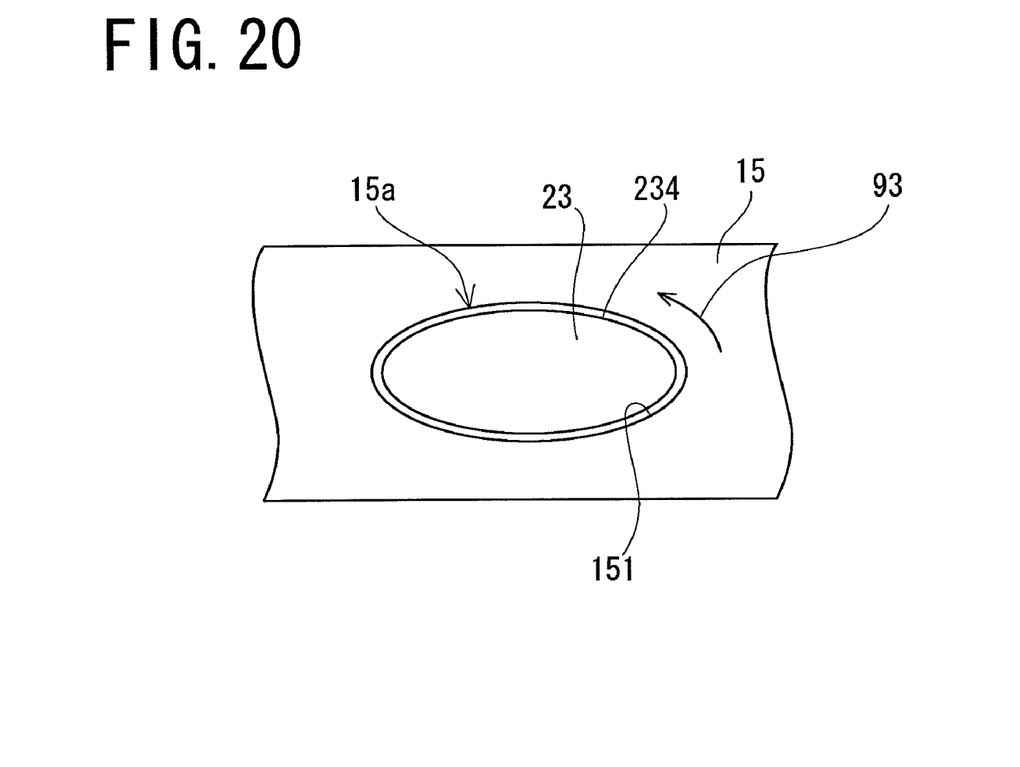
FIGS. 20 and 21 each show a video camcorder according to a second modification.

In more detail, the video camcorder has a receiving part 15 instead of the side wall section 13 and the circuit board 14. Like the side wall section 13 and the circuit board 14, the receiving part 15 defines the space 33 between the receiving part 15 and the hole forming section 12. A hole 15a is formed in the receiving part 15. The receiving part 15 may alternatively be formed as part of the casing 1.

When the cover member 2 moves back and forth between the depressed position and the pulled-out position, the hole 15a stores therein the protrusion 23 in such a manner that the protrusion 23 is allowed to move in the hole 15a. A side surface 234 of the protrusion 23 stored in the hole 15a entirely faces an inner surface 151 of the hole 15a with a short distance from the inner surface 151, or has face-to-face contact with the inner surface 151. In FIG. 20, the side surface 234 entirely faces the inner surface 151 with a short distance from the inner surface 151.

Like in the video camcorder discussed above, the casing 1 is hardly damaged by the cover part 21 in the video camcorder of the second modification. This is because, as the side surface 234 of the protrusion 23 stored in the hole 15a entirely faces the inner surface 151 of the hole 15a with a short distance from the inner surface 151, or has face-to-face contact with the inner surface 151, the pivotal movement of the protrusion 23 about the shank 22 is prevented by the receiving part 15 when the cover member 2 moves back and forth between the depressed position and the pulled-out position.

Further, as discussed previously, the side surface 234 of the protrusion 23 when in the hole 15a entirely faces the inner surface 151 of the hole 15a with a short distance from the inner surface 151, or has face-to-face contact with the inner surface 151. Thus, the protrusion 23 after having moved from the hole 15a to the space 33 is only required to pivotally move slightly about the shank 22 (in the direction 93), so that the protrusion 23 overlaps the receiving part 15. As a result, the press of the cover member 2 into the casing 1 is prevented by the receiving part 15.

Figure 21:
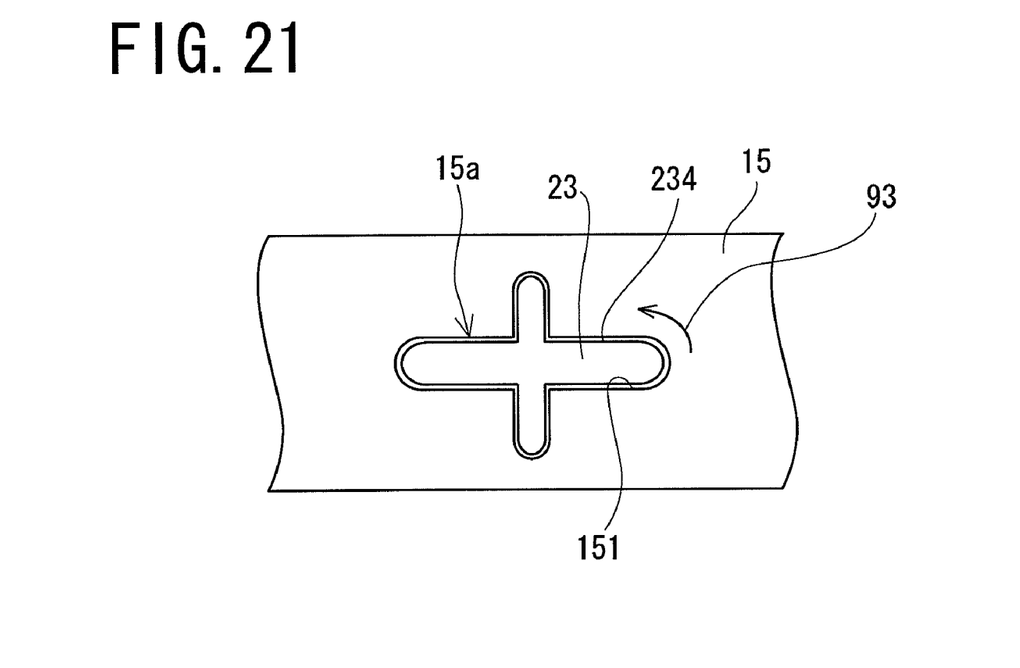

The technique of the second modification is applicable not only to the oval-shaped protrusion 23 when viewed in a direction opposite to the pulling-out direction 91, but also to the protrusion 23 of a different shape as shown in FIG. 21, with the exception of the protrusion 23 of circular shape. The protrusion 23 shown in FIG. 21 has a crisscross pattern.

THIRD EMBODIMENT

In the video camcorder discussed above, the side wall section 13 and the circuit board 14 prevent the pivotal movement of the cover member 2 when the cover member 2 moves back and forth between the depressed position and the pulled-out position, and the pressing-in of the cover member 2 in the pulled-out position. Alternatively, either the side wall section 13 or the circuit board 14 may be responsible for the prevention of such pivotal movement and pressing-in of the cover member 2.

Still alternatively, at least the side wall section 13 or the circuit board 14 may prevent the pivotal movement of the cover member 2 about the shank 22 when the cover member 2 moves back and forth, and the pressing-in of the cover member 2 in the pulled-out position may be prevented by a member that is not the side wall section 13 nor the circuit board 14.

The structure of each part of the present invention is not limited to that shown in the preferred embodiment discussed above. Various modifications may be devised within the technical scope defined in claims. By way of example, the above-discussed technique is applicable to a socket such as a battery socket other than the memory card socket 11a. Further, the above-discussed technique is applicable to various electronic devices such as mobile phones other than video camcorders.

The invention claimed is:
1. An electronic device comprising a casing with an opening, and a cover member for covering said opening,
said cover member including:
a cover part for covering said opening;
a shank projecting from a rear surface of said cover part, while passing through a hole defined in said casing; and a protrusion sticking out of said shank, at a position opposite to said cover part with respect to said hole, in a direction crossing an axis of said shank, said cover member being capable of moving back and forth along said axis of said shank, between a depressed position where said cover part covers said opening and a pulled-out position where said cover part is apart from said opening, said casing having a first receiving part for receiving said protrusion to prevent the pivotal movement of said cover member about said shank when said cover member moves back and forth between said depressed position and said pulled-out position, and receiving said protrusion to prevent the pressing-in of said cover member after having moved pivotally about said shank while enabling the pivotal movement of said cover member about said shank when said cover member is in said pulled-out position.

2. The electronic device according to claim 1, wherein said casing further has a second receiving part for receiving said protrusion to prevent said cover member from being disconnected from said casing, irrespective of an angle of pivotal movement of said cover member in said pulled-out position.

3. The electronic device according to claim 2, wherein said protrusion overlaps said second receiving part when viewed in a direction opposite to a pulling-out direction of said cover member, irrespective of an angle of pivotal movement of said cover member.

4. The electronic device according to claim 1, wherein space for allowing the pivotal movement of said protrusion about said shank is defined in said casing between said first and second receiving parts, and said protrusion is located in said space when said cover member is in said pulled-out position.

5. The electronic device according to claim 4, wherein the pivotal movement of said cover member in said pulled-out position about said shank causes said protrusion to overlap said first receiving part when viewed in a direction opposite to a pulling-out direction of said cover member.

6. The electronic device according to claim 1, wherein said protrusion has a side surface extending along said axis of said shank, said first receiving part has a side surface extending in a pulling-out direction of said cover member, and when said cover member moves back and forth between said depressed position and said pulled-out position, said side surface of said protrusion faces said side surface of said first receiving part with a short distance from said side surface of said first receiving part, or has face-to-face contact with said side surface of said first receiving part.

7. The electronic device according to claim 6, wherein two sets each of which being constituted by said side surface of said protrusion and said side surface of said first receiving part facing each other with a short distance therebetween, or in face-to-face contact with each other, are provided, and respective side surfaces of said protrusion belonging to said two sets face each other, with distances from a center of said shank to said side surfaces of said protrusion being different from each other.

8. The electronic device according to claim 1, wherein said first receiving part defines space for storing therein said protrusion when said cover member moves back and forth between said depressed position and said pulled-out position, and a maximum width of an outer edge of said protrusion when viewed in a direction opposite to a pulling-out direction of said cover member is greater than a minimum width of said space when viewed in a direction opposite to said pulling-out direction.

* * * * *